Patented Nov. 21, 1933

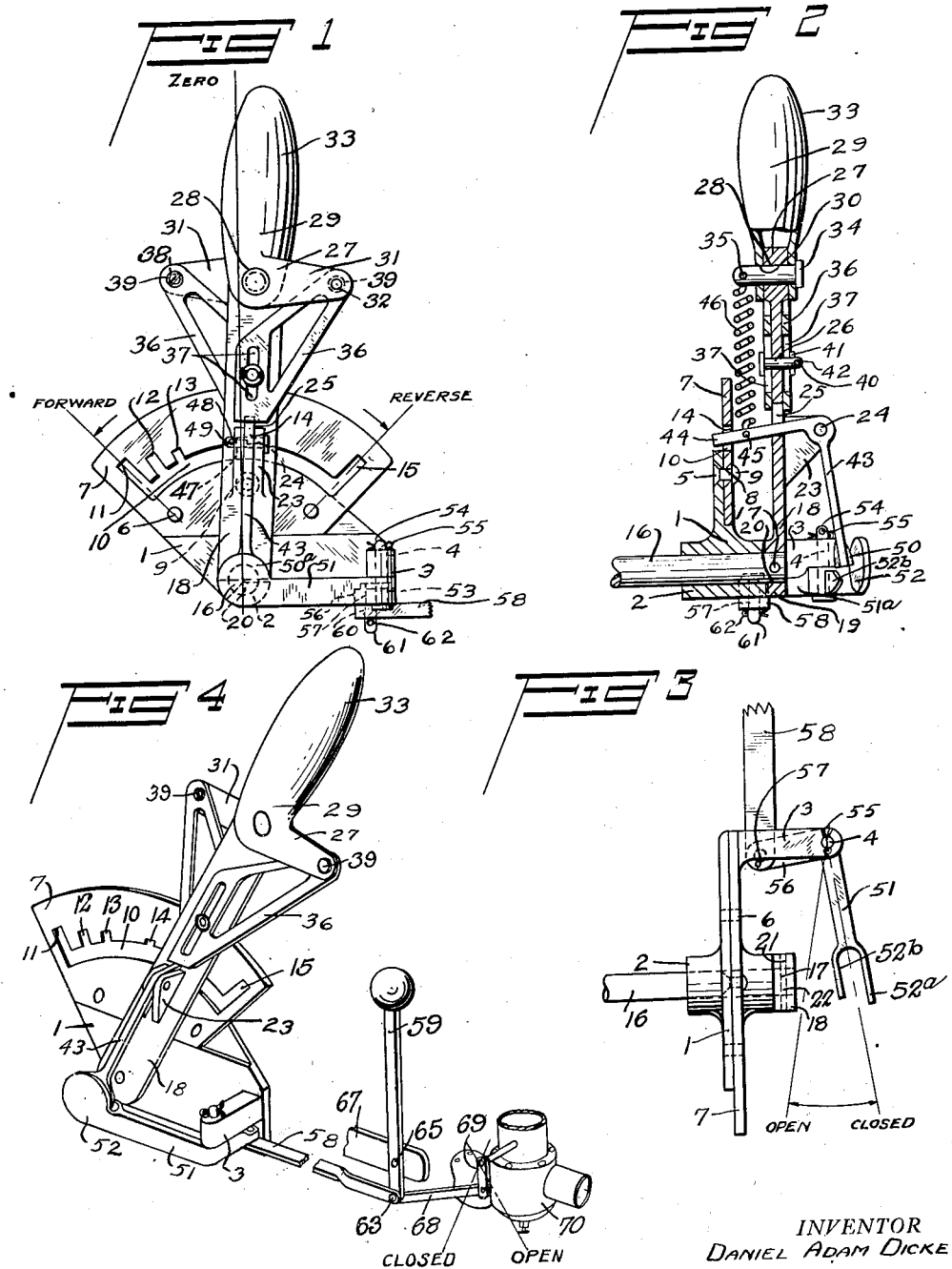

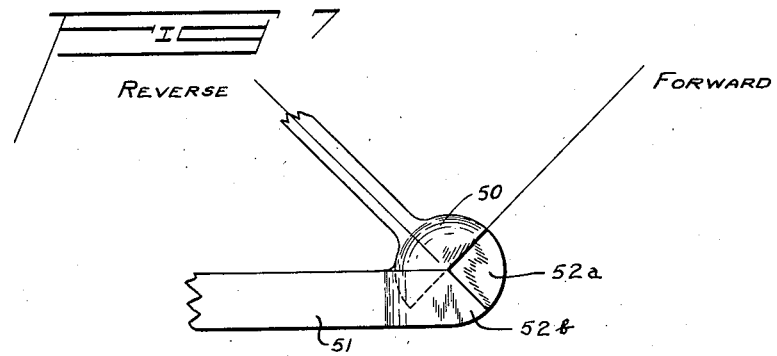
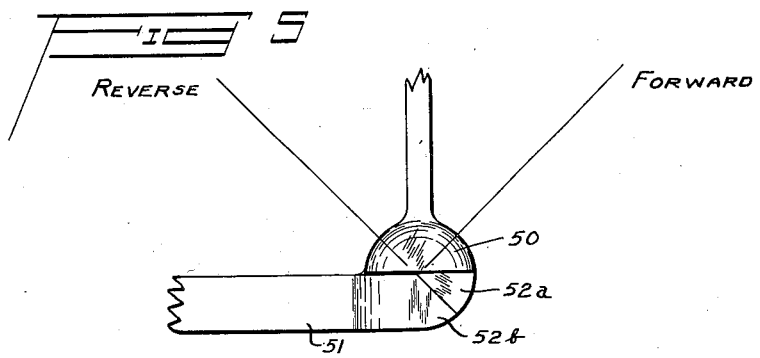
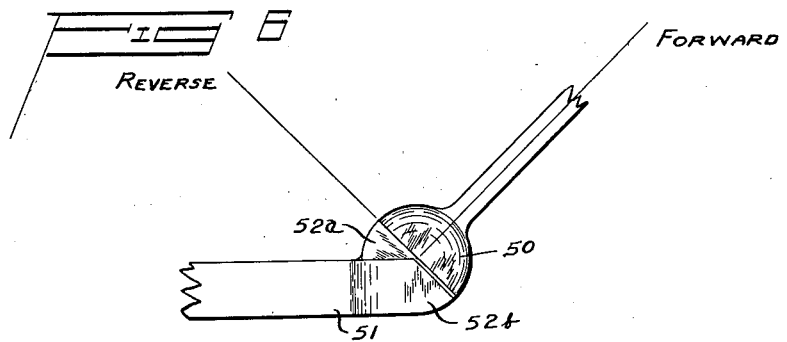

1,935,620

UNITED STATES PATENT OFFICE 1,935,620

SYNCHRONIZED THROTTLE CONTROL AND CONTROL FOR REVERSIBLE OR ADJUSTABLE PITCH PROPELLERS

Daniel A. Dickey, Dayton, Ohio

Application September 25, 1931
Serial No. 565,022

30 Claims. (Cl. 244—25)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to a synchronized throttle control and control for a reversible or adjustable pitch propeller.

The principal object of the invention is to provide an interconnected throttle control and control for a reversible or adjustable pitch propeller which prevents the opening of the throttle in the course of a change in the pitch adjustment of the propeller, so as to avoid the possibility of destructive racing of the engine, and to provide for different degrees of throttle opening for the different stages of pitch adjustment whereby a maximum throttle opening can be secured only in the full forward or reversed pitch conditions and less throttle opening secured as conditions vary from zero pitch to full forward pitch conditions.

Another object is to provide a simplified mechanism for obtaining the results hereinabove described consisting of a single manually operated control member having connection with the pitch changing means and the throttle adjusting means so that the throttle is closed upon the initial operation of the control member. Before the pitch of the propeller is changed, the arrangement further provides for those limits of adjustments of the throttle in each position of adjustment of the control member corresponding to the different stages of propeller adjustments discussed hereinabove.

A further object is to provide in the mechanism hereinabove described means for automatically opening the throttle when the throttle adjusting means is released with the pitch changing means in full reverse pitch condition.

Mechanisms recently designed for reversing or adjusting the pitch of airplane propellers are of a form enabling the operation by a manually operated lever, where the engine is throttled down at the time the change in pitch is made. Aside from the necessity for making the adjustment of the pitch easy by idling the engine, this precaution is taken as a measure of safety because an adjustment of the pitch through the zero region with the throttle open would result in destructive racing of the engine and would also place unnecessary loads upon the pitch changing mechanism.

The mechanism hereinabove described is provided with a second lever corresponding in function to the throttle lever of the present types of engine control units. This second lever mounts a pitch changing lever to which it is flexibly connected. The engine throttle is actuated by a certain degree of movement of the throttle adjusting lever relative to the pitch changing lever. In changing the pitch of the propeller or reversing its pitch, the initial operation of the throttle adjusting lever brings the engine to an idling condition, with the engine throttle substantially closed. Additional movement of the pitch changing lever, by means of the throttle adjusting lever utilized as a handle, in either direction results in a change of the pitch of the propeller. The flexible connection between the throttle adjusting lever and the pitch changing lever permits full range of engine throttle adjustment only when the pitch changing lever is placed in the full forward or the full reversed positions. Provision is also made to give diminishing extents of engine throttle adjustment at certain prearranged positions of the pitch changing lever from full forward towards zero pitch. In all other positions of the pitch changing lever the throttle adjustment is closed and the throttle cannot be manually opened by means of the throttle lever of the engine control unit. In the full forward and certain prearranged positions of the pitch changing lever, operation of the throttle adjusting lever closes the throttle and it is necessary for the pilot to resort to manual operation of the engine control unit in order to reopen the engine throttle. In the full reversed position of the pitch changing lever the engine throttle may be opened or closed through actuation of the throttle adjusting lever only. The pitch changing lever operates relative to a sector and is normally moved to that end of the sector where the pitch of the propeller is full forward.

With the foregoing and other objects in view, which will appear as the description proceeds, the invention consists of improvements embodied in a control mechanism as hereinafter more fully illustrated and described in the accompanying drawings and more particularly pointed out in the appended claims.

Referring to the drawings, in which numerals of like character designate similar parts throughout the several views:

Fig. 1 is a side view of a control mechanism embodying the improvements of my invention:

Fig. 2 is an end view, partially in cross-section, of the above control mechanism;

Fig. 3 is a plan view of certain parts of the above control mechanism;

Fig. 4 is a perspective view showing diagrammatically the connection of the above control mechanism with the pitch changing and the throttle adjusting means; and Figs. 5, 6 and 7 illustrate details of operation of the mechanism.

The principal parts of my invention consist of a bracket 1, to which is attached the sector 7; a shaft 16 supported by bracket 1; a pitch lever 18 attached to shaft 16; a throttle adjusting lever 29 pivotally attached to the upper end of pitch changing lever 18; two links 36 pivotally attached at the tops to the outer extremities of throttle adjusting lever 29 and guided at the bottom by pin 40 secured to pitch changing lever 18; a bell-crank 43 pivotally attached to pitch changing lever 18; a forked bell-crank 51 pivotally attached to bracket 1 and connecting links 58 and 68 pivotally attached to the forked bell-crank 51, to a throttle lever 59 and to a butterfly lever 69 of a carburetor 70; the throttle lever 59 being further pivotally attached to a bracket 67 fixedly attached to the fuselage structure.

Bracket 1 comprises a flat surface from which project bearing 2 and arm 3. A pin hole 4 is provided in arm 3 for pivotal attachment of forked bell-crank 51. A countersunk rivet hole 5 is provided for attachment of sector 7 to the flat surface of bracket 1. Two screw holes 6 are provided for attachment of the assembled control mechanism shown in Fig. 1 to the side of the pilot's cockpit, adjacent to the engine control unit.

Sector 7 is of flat plate form. Attachment to bracket 1 is secured primarily by rivet 9 passed through rivet holes 5 and 8 and secondarily by the screws passed through two screw holes 6 for attachment of the assembled control mechanism to the side of the pilot's cockpit. A slot 10 is provided in the sector 7, through which the end 44 of the bell-crank 43 is inserted. Slot 10 is so formed that the end 44 of the bell-crank 43 will be secured in a position corresponding to minimum engine throttle opening as long as the end 44 remains within slot 10 or the notch 14 hereinafter described. The two ends of slot 10 limit the lateral travel of the end 44 of the bell-crank 43 to positions corresponding to full forward and full reverse placement of the pitch changing lever. A series of notches are interconnected with the slot 10 in such a manner that upward movements of the end 44 latches the bell-crank 43 to the sector 7, thereby securing the pitch changing lever 18 against rotational movement about shaft 16 and further providing for varying degrees of engine throttle opening. Notch 11 contributes to the securing of the propeller blades in a condition of full forward pitch and provides for maximum engine throttle opening. Notches 12 and 13 contribute to the securing of the propeller blades at diminishing angles below full forward pitch and provide for intermediate stages of engine throttle opening. Notch 14 contributes to the securing of the propeller blades in a condition of zero pitch setting and further provides for a minimum engine throttle opening corresponding to the throttle opening provided by the slot 10. Notch 14 is made shallow in order that a minimum of lost motion connection will be required in the throttle adjusting means to compensate for the slight upward travel of the end 44 of the bell-crank 43. Notch 15 contributes to the securing of the propeller blades in a condition of full reversed pitch and provides for maximum engine throttle opening.

Shaft 16 is supported in bearing 2 of bracket 1. It is secured at its inner end to pitch changing lever 18 by means of the boss pin 22 passed through boss pin hole 21 and shaft pin hole 17. The outer end of shaft 16 is suitably connected with the pitch changing means ordinarily mounted at the forward end of the engine crank-shaft.

Pitch changing lever 18 is provided at its lower extremity with boss 19 and shaft hole 20. Fixed attachment of pitch changing lever 18 to shaft 16 is effected by passage of boss pin 22 through boss pin hole 21 and shaft pin hole 17. Pitch changing lever 18 is thus pivotally attached to bracket 1. Two arms 23, located at the central portion of pitch changing lever 18, are provided with pin holes 24 and slot 25. A pin hole 26 is further provided immediately above slot 25. Pitch changing lever 18 terminates at its upper extremity in boss 27, which is provided with pin hole 28.

Throttle adjusting lever 29 is provided at its base with pin hole 30 and opposite extending arms 31 which have threaded holes 32 at their outer extremities. The throttle adjusting lever 29 terminates in the handle 33 and is pivotally attached to pitch changing lever 18 by means of clevis pin 34, which pin is secured in place by insertion of the upper end of spring 46 through spring hole 35.

Two links 36 are provided at their lower extremities with slots 37 and screw holes 38 at their upper extremities. Pivotal attachment of links 36 to opposite extending arms 31 is effected by insertion of screws 39 through screw holes 38 and into threaded holes 32. Sliding attachment of the lower extremities of links 36 to the pitch changing lever 18 is effected by insertion of clevis pin 40 through slot 37 of the link 36 adjacent to sector 7; through pin hole 26 of the pitch changing lever 18; through slot 37 of the link 36 immediately above arms 23 of the pitch changing lever 18 and through washer 41. Accidental withdrawal of the clevis pin 40 from washer 41 is prevented by insertion of cotter pin 42.

Bell-crank 43 is pivotally attached at its center portion to pitch changing lever 18 by means of clevis pin 48 passed through pin holes 24 of the arms 23 and pin hole 47 of the bell-crank proper. Accidental withdrawal of clevis pin 48 is prevented by insertion of cotter pin 49. The upper end 44 of bell-crank 43 extends through slot 25 of the pitch changing lever 18 and through slot 10 of sector 7. It is held in pressure contact against the upper surfaces of slot 10 or notches 11, 12, 13, 14 and 15 of the sector 7 by means of a spring 46. Spring 46 is secured at its upper extremity to clevis pin 34 by passage of the end portion of the spring through spring hole 35 and at its lower extremity to bell-crank 43 by passage of the end portion of the spring through spring hole 45.

The lower end 50 of the bell-crank 43 has been shaped in such a manner as to provide maximum contact with the inner surfaces of ends 52a and 52b of the forked bell-crank 51. The shape hereinabove described also provides for minimum lost motion during actuations of one bell-crank through movement of the other bell-crank. Further considerations in connection with the cutting away of lower half of end 50 will be discussed hereinafter.

Forked bell-crank 51 is pivotally attached at its center portion to bracket 1 by means of clevis pin 54 passed through pin hole 4 of arm 3 attached to bracket 1 and through pin hole 53 of the bell-crank proper. Accidental withdrawal of clevis pin 54 is prevented by insertion of cotter pin 55. The end 56 of the forked bell-crank 51 is provided with pin hole 57. Engagement of the ends 52a and 52b of the forked bell-crank 51 with lower end 50 of the bell-crank 43 has been previously discussed. Further consideration in connection with the cutting away of a portion of the disc of the end 52b of the forked bell-crank 51 will be discussed hereinafter.

Connecting link 58 is pivotally attached to end 56 of the forked bell-crank 51 by means of clevis pin 61 passed through pin hole 57 of the bell-crank proper and through pin hole 60 of the connecting rod proper. Accidental withdrawal of clevis pin 61 is prevented by insertion of cotter pin 62. The outer end of connecting link 58 is pivotally connected to the lower extremity of an engine throttle lever 59 by means of a clevis pin 63 and a cotter pin 64. The lever 59 is further pivotally attached by means of a clevis pin 65 and a cotter pin 66 to a bracket 67 which has been previously fixedly attached to the fuselage structure. A second connecting link 68 is also pivotally connected to the lower extremity of lever 59 by means of the clevis pin 63 and the cotter pin 64. The remaining extremity of the link 68 is pivotally connected to a butterfly lever 69 of a carburetor 70 by means of the clevis pin 71 and cotter pin 72.

Referring to Figs. 1 and 2, the operation of the control mechanism is as follows. Pitch lever 18 is shown slightly to the right of that position which secures the pitch changing mechanism in a condition of zero propeller pitch. It will be observed that full oscillation of auxiliary throttle adjusting lever 29 to left or right results in downward and upward movements of the links 36 in equal and opposite directions. The foregoing oscillations would result in alternate downward and upward movements of upper end 44 of the bell-crank 43 were it not for the fact that the top surface of slot 10 of the sector 7 has been provided for the purpose of holding the upper end 44 substantially in contact with the bottom surface of slot 25 of the pitch changing lever 18. Through interconnection with connecting rod 58, forked bell-crank 51 and bell-crank 43; the throttle lever 59 is positively secured in a closed position as long as upper end 44 remains in contact with the top surface slot 10 of the sector 7. During the period that upper end 44 remains in the foregoing position the pilot cannot open the engine throttle by means of the engine control unit and therefore destructive racing of the engine is definitely provided against.

Referring to Fig. 1, let it be assumed that pitch changing lever 18 is oscillated to the left by means of the handle 33 until upper end 44 is immediately beneath notch 13 of the sector 7. If the grasp upon handle 33 is gradually released upper end 44 will move upward until it rests against the top of notch 13. Engagement of end 44 within notch 13 locks pitch changing lever 18, which in turn locks the pitch changing mechanism in an intermediate position between zero propeller pitch and full forward propeller pitch. The foregoing engagement also moves the lower end 50 of the bell-crank 43 inward toward the end of shaft 16. The latter movement permits the pilot to partially open the engine throttle by means of the engine control unit throttle lever 59. The degree of opening of the engine throttle is limited by movement of connecting rod 58 to the right and clockwise movement of forked bell-crank 51, as viewed in Fig. 3, until contact is made between the end 52a of the forked bell-crank 51 and the end 50 of the bell-crank 43. Oscillating pitch changing lever 18 further to the left and further engagement of the upper end 44 within notches 12 and 11, locks pitch changing lever 18 and the pitch changing mechanism in one further intermediate position and the full forward propeller pitch position. The degree of opening of the throttle increases until full opening may be effected when upper end 44 of the bell-crank 43 enters completely within notch 11 of the sector 7.

It will be noted that full oscillation of handle 33 to the left or right for the purpose of disengaging upper end 44 from notches 11, 12 and 13 of the sector 7 automatically closes the throttle lever 59 through engagement of the end 50 of the bell-crank 43 with the end 52a of the forked bell-crank 51 resulting in downward movement of connecting rod 58, as viewed in Fig. 3. It will be further noted that the lower half of end 50 of the bell-crank 43 has been cut away and that approximately five-eighths of the end 52b of the forked bell-crank 51 has also been cut away, both in the manner indicated in Figs. 5 through 7. Thus return of handle 33 to a position of longitudinal alignment with pitch changing lever 18 following the aforementioned disengagements, does not effect return of forked bell-crank 51 to the "Open" position noted in Fig. 3. As shown in Figs. 5 and 6, the returning end 50 does not contact with the end 52b of the forked bell-crank 51 and therefore leaves the forked bell-crank 51 in the "Closed" position shown in Fig. 3. It is necessary for the pilot to manually reopen the throttle lever 59 by means of the engine after each engagement of upper end 44 in notches 11, 12 or 13 of the sector 7, as may be seen by reference to Fig. 4.

Referring to Fig. 1, let it be assumed that pitch changing lever 18 is oscillated to the right by means of the handle 33 until upper end 44 is immediately beneath notch 15 of the sector 7. Then the left-hand portion of the end 50, as viewed in Fig. 7, will have also moved in back of the uncut away portion of the end 52b of the forked bell-crank 51. If the grasp upon handle 33 is gradually released, upper end 44 will move upward until it rests against the top of notch 15. Engagement of end 44 within notch 15 locks pitch changing lever 18, which in turn locks the pitch changing mechanism in a position of full reversed pitch. During the process of the foregoing engagement the lower end 50 of the bell-crank 43 moves inwardly toward the end of shaft 16. Since the ends 50 and 52b are in direct contact, both will move inwardly together, causing the forked bell-crank 51 to rotate in a counterclockwise direction, as viewed in Fig. 3, which in turn will cause the connecting rod 58 to move upward into a full open engine throttle position. Through the above arrangement the throttle lever 59 is automatically opened whenever upper end 44 is fully engaged within notch 15.

While the sector 7 has been illustrated and described as having a series of notches to define the different positions of the pitch changing lever 18 and to limit by the depth of the notches the throttle adjustments which can be secured in the different positions of the lever, it will be understood that a similar operation can be secured by eliminating the notches and having a follower replace the latch and move over a smooth faced cam, the contour of which will provide different extents of throttle adjustment in different positions of the lever. In this case other means would be provided to hold the pitch changing lever 18 frictionally or otherwise in adjusted position. In a similar manner the initial operation of the throttle adjusting lever 29 could be made to release the pitch changing lever 18 and simultaneously close the throttle, whereupon the pitch adjustment could be obtained as hereinabove described.

I claim:

1. In a mechanism of the character described, a propeller pitch changing means, a lever for operating the same, a throttle adjusting means, a second lever for operating the same, a flexible connection between said pitch and throttle levers, and means for securing said throttle adjusting means in a position of minimum throttle opening during all periods of motion of said pitch changing means.

2. In a mechanism of the character described, a propeller pitch changing means, a lever for operating the same, a throttle adjusting means, a second lever for operating the same, a flexible connection between the said pitch and throttle levers, means for securing said throttle adjusting means in a position of minimum throttle opening during all periods of motion of said pitch changing means, and further means for limiting maximum oscillation of said pitch lever to the two positions corresponding to full forward and full reverse pitch of the propeller.

3. In a mechanism of the character described, a propeller pitch changing means, a lever for operating the same, a throttle adjusting means, a second lever for operating the same, a flexible connection between the said pitch and throttle levers, means for securing said throttle adjusting means in a position of minimum throttle opening during all periods of motion of said pitch changing means, further means for limiting maximum oscillation of said pitch lever to the two positions corresponding to full forward and full reverse pitch of the propeller, and still further means for securing said pitch lever in predetermined positions corresponding to the latching of said pitch changing means in adjustments ranging from zero to full forward pitch and full reverse pitch of the propeller.

4. In a mechanism of the character described, a propeller pitch changing means, a lever for operating the same, a throttle adjusting means, a second lever for operating the same, a flexible connection between the said pitch and throttle levers, means for securing said throttle adjusting means in a position of minimum throttle opening during all periods of motion of said pitch changing means, further means for limiting maximum oscillation of said pitch lever to the two positions corresponding to full forward and full reverse pitch of the propeller, means for securing said pitch lever in predetermined positions corresponding to the latching of said pitch changing means in adjustments ranging from zero to full forward pitch and full reverse pitch of the propeller, and still further means for limiting the extent of the operation of the engine throttle lever for said above-mentioned positions of said pitch lever ranging from full engine throttle for full forward or full reverse placements of the pitch changing means to minimum engine throttle opening for zero pitch placement of the pitch changing means.

5. In a mechanism of the character described, a propeller pitch changing means, a lever for operating the same, a throttle adjusting means, a second lever for operating the same, a flexible connection between the said pitch and throttle levers, means for securing said throttle adjusting means in a position of minimum throttle opening during all periods of motion of said pitch changing means, further means for limiting maximum oscillation of said pitch lever to the two positions corresponding to full forward and full reverse pitch of the propeller, still further means for securing said pitch lever in predetermined positions corresponding to the latching of said pitch changing means in adjustments ranging from zero to full forward pitch and full reverse pitch of the propeller, still further means for limiting the extent of the operation of the engine throttle lever for said above-mentioned positions of said pitch lever ranging from full engine throttle for full forward or full reverse placements of the pitch changing means to minimum engine throttle opening for zero pitch placement of the pitch changing means, and final means whereby full movement of said throttle lever effects release of said above-mentioned pitch lever securing means and further assures that said throttle adjusting means will be held in a position corresponding to minimum throttle opening during movement of said pitch lever to either side of zero pitch placement for the purpose of increasing or decreasing or reversing the pitch of the propeller associated with said pitch changing means.

6. In a mechanism of the character described, a pitch changing means, a pitch lever connected therewith operable from one extreme position corresponding to full forward pitch of the propeller to another extreme position corresponding to the full reverse pitch of the propeller, a throttle adjusting means, a throttle lever connected therewith, a connection between said pitch and throttle levers whereby full operation of said throttle lever releases and produces the operation of said pitch lever, with the operation of the said throttle lever preceding the operation of the said pitch lever, and means whereby said pitch and throttle levers may be latched in positions corresponding from zero pitch to full forward pitch of the propeller associated with the pitch changing means.

7. In a mechanism of the character described, a pitch changing means, a pitch lever connected therewith operable from one extreme position corresponding to full forward pitch of the propeller to another extreme position corresponding to the full reverse pitch of the propeller, a throttle adjusting means, a throttle lever connected therewith, a connection between said pitch and throttle levers whereby full operation of said throttle lever releases and produces the operation of said pitch lever, with the operation of the said throttle lever preceding the operation of the said pitch lever, means whereby said pitch and throttle levers may be latched in positions corresponding from zero pitch to full forward pitch of the propeller associated with the pitch changing means, and further means whereby said pitch and throttle levers may be latched in a position corresponding to full reverse pitch of the propeller associated with the pitch changing means.

8. In a mechanism of the character described, a pitch changing means, a pitch lever connected therewith operable from one extreme position corresponding to full forward pitch of the propeller to another extreme position corresponding to the full reverse pitch of the propeller, a throttle adjusting means, a throttle lever connected therewith, a connection between said pitch and throttle levers whereby full operation of said throttle lever releases and produces the operation of said pitch lever, with the operation of the said throttle lever preceding the operation of the said pitch lever, means whereby said pitch and throttle levers may be latched in positions corresponding from zero pitch to full forward pitch of the propeller associated with the pitch changing means, further means whereby said pitch and throttle levers may be latched in a position corresponding to full reverse pitch of the propeller associated with the pitch changing means, and automatic means connected with said throttle lever whereby said throttle adjusting means is secured in a position of minimum throttle opening as the said pitch lever approaches a position corresponding to zero pitch placement of the propeller associated with the pitch changing means.

9. In a mechanism of the character described, a pitch changing means, a pitch lever connected therewith operable from one extreme position corresponding to full forward pitch of the propeller to another extreme position corresponding to the full reverse pitch of the propeller, a throttle adjusting means, a throttle lever connected therewith, a connection between said pitch and throttle levers whereby full operation of said throttle lever releases and produces the operation of said pitch lever, with the operation of the said throttle lever preceding the operation of the said pitch lever, means whereby said pitch and throttle levers may be latched in positions corresponding from zero pitch to full forward pitch of the propeller associated with the pitch changing means, further means whereby said pitch and throttle levers may be latched in a position corresponding to full reverse pitch of the propeller associated with the pitch changing means, automatic means connected with said throttle lever whereby said throttle adjusting means is secured in a position of minimum throttle opening as the said pitch lever approaches a position corresponding to zero pitch placement of the propeller associated with the pitch changing means, whereby said throttle adjusting means is further secured in a position of minimum throttle opening as said pitch lever approaches positions of full forward and full reverse pitch and whereby said throttle adjusting means may be opened to positions of maximum throttle opening when said pitch lever has attained the two above-mentioned positions.

10. In a mechanism of the character described, a pitch changing means, a pitch lever connected therewith operable from one extreme position corresponding to full forward pitch of the propeller to another extreme position corresponding to the full reverse pitch of the propeller, a throttle adjusting means, a throttle lever connected therewith, a connection between said pitch and throttle levers whereby full operation of said throttle lever releases and produces the operation of said pitch lever, with the operation of the said throttle lever preceding the operation of the said pitch lever, means whereby said pitch and throttle levers may be latched in positions corresponding from zero pitch to full forward pitch of the propeller associated with the pitch changing means, further means whereby said pitch and throttle levers may be latched in a position corresponding to full reverse pitch of the propeller associated with the pitch changing means, automatic means connected with said throttle lever whereby said throttle adjusting means is secured in a position of minimum throttle opening as the said pitch lever approaches a position corresponding to zero pitch placement of the propeller associated with the pitch changing means, whereby said throttle adjusting means is further secured in a position of minimum throttle opening as said pitch lever approaches positions of full forward and full reverse pitch and whereby said throttle adjusting means may be opened to positions of maximum throttle opening when said pitch lever has attained the two above-mentioned positions, whereby said throttle adjusting means is still further secured in a position of minimum throttle opening as said pitch lever approaches predetermined positions ranging from zero pitch to full forward pitch and whereby said throttle adjusting means may be increasingly opened as the pitch lever attains the above-mentioned predetermined positions ranging from zero pitch towards full forward pitch.

11. In a mechanism of the character described, a propeller pitch adjusting shaft, a pitch lever for turning the same, a throttle lever serving as a handle for said pitch lever and flexibly mounted upon the end thereof, throttle adjusting means having connection with an automatic throttle closing means and said throttle lever, manual throttle adjustment to be accomplished by movement of said throttle lever relative to said pitch lever.

12. In a mechanism of the character described, a propeller pitch adjusting shaft, a pitch lever for turning the same, a throttle lever serving as a handle for the pitch lever and flexibly mounted upon the end thereof, throttle adjusting means having connection with an automatic throttle closing means and said throttle lever, and means for holding said pitch and throttle levers in any one of a plurality of positions while permitting the movement of said throttle lever relative to said pitch lever for manually operating said throttle adjusting means.

13. In a mechanism of the character described, a propeller pitch adjusting shaft, a pitch lever for turning the same, a throttle lever serving as a handle for the pitch lever and flexibly mounted upon the end thereof, throttle adjusting means having connection with an automatic throttle closing means and said throttle lever, means for holding said pitch and throttle levers in any one of a plurality of positions while permitting the movement of said throttle lever relative to said pitch lever for manually operating said throttle adjusting means, and further means for limiting the maximum movements of said pitch lever to positions corresponding to full forward pitch and full reverse pitch of the propeller.

14. In a mechanism of the character described, a propeller pitch adjusting shaft, a pitch lever for turning the same, a throttle lever serving as a handle for the pitch lever and flexibly mounted upon the end thereof, throttle adjusting means having connection with an automatic throttle closing means and said throttle lever, means for holding said pitch and throttle levers in any one of a plurality of positions while permitting the movement of said throttle lever relative to said pitch lever for manually operating said throttle adjusting means, further means for limiting the maximum movements of said pitch lever to positions corresponding to full forward pitch and full reverse pitch of the propeller, and still further means for limiting the extents of manual adjustment of said throttle adjusting means in different positions of said pitch lever.

15. In a mechanism of the character described, a propeller pitch adjusting shaft, a pitch lever for turning the same, a throttle lever pivotally mounted upon the end thereof and having arms extending in opposite directions relative to said pivotal connection, a member mounted on said pitch lever and moving in unison therewith, linkage having lost motion connection with said oppositely extending arms and said member mounted on said pitch lever, an automatic throttle closing means having connection with said member mounted on said pitch lever, and throttle adjusting means, connected with said member mounted on said pitch lever.

16. In a mechanism of the character described, a propeller pitch adjusting shaft, a pitch lever connected therewith for turning the same, a throttle lever serving as a handle for said pitch lever and pivotally mounted upon the end thereof, a member pivotally mounted on said pitch lever to be severally operated by movements of said throttle lever relative to said pitch lever and movements of an automatic throttle closing means, and throttle adjusting means connected with said member.

17. In a mechanism of the character described, a propeller pitch adjusting shaft, a pitch lever connected therewith for turning the same, a throttle lever serving as a handle for said pitch lever, a bell-crank pivotally mounted on said pitch lever to be severally operated by movements of said throttle lever relative to said pitch lever and movements of an automatic throttle closing means having as a principal part thereof a sector, one extremity of said bell-crank having connection with said throttle adjusting means and the other extremity of said bell-crank having the form of a latch, said latch cooperating with said sector to prevent or permit free manual operation of said throttle adjusting means.

18. In a mechanism of the character described, a propeller pitch adjusting shaft, a pitch lever connected therewith for turning the same, a throttle lever serving as a handle for said pitch lever, a bell-crank pivotally mounted on said pitch lever to be severally operated by movements of said throttle lever relative to said pitch lever and movements of an automatic throttle closing means having as a principal part thereof a sector, one extremity of said bell-crank having connection with said throttle adjusting means and the other extremity of said bell-crank having the form of a latch, said latch cooperating with said sector to prevent or permit free manual operation of said throttle adjusting means, said sector being provided with a slot through which said latch of said bell-crank passes for the purpose of limiting the extent of manual operation of the throttle adjusting means during all periods of movements of said pitch lever.

19. In a mechanism of the character described, a propeller pitch adjusting shaft, a pitch lever connected therewith for turning the same, a throttle lever serving as a handle for said pitch lever, a bell-crank pivotally mounted on said pitch lever to be severally operated by movements of said throttle lever relative to said pitch lever and movements of an automatic throttle closing means having as a principal part thereof a sector, one extremity of said bell-crank having connection with said throttle adjusting means and the other extremity of said bell-crank having the form of a latch, said latch cooperating with said sector to prevent or permit free manual operation of said throttle adjusting means, said sector being provided with a slot through which said latch of said bell-crank passes for the purpose of limiting the extent of manual operation of the throttle adjusting means during all periods of movements of said pitch lever, and for the further purpose of limiting the maximum movements of said pitch lever to positions corresponding to full forward pitch and full reverse pitch of the propeller.

20. In a mechanism of the character described, a propeller pitch adjusting shaft, a pitch lever connected therewith for turning the same, a throttle lever serving as a handle for said pitch lever, a bell-crank pivotally mounted on said pitch lever to be severally operated by movements of said throttle lever relative to said pitch lever and movements of an automatic throttle closing means having as a principal part thereof a sector, one extremity of said bell-crank having connection with said throttle adjusting means and the other extremity of said bell-crank having the form of a latch, said latch cooperating with said sector to prevent or permit free manual operation of said throttle adjusting means, said sector being provided with a slot through which said latch of said bell-crank passes for the purpose of limiting the extent of manual operation of the throttle adjusting means during all periods of movements of said pitch lever, and for the further purpose of limiting the maximum movements of said pitch lever to positions corresponding to full forward pitch and full reverse pitch of the propeller, said sector being further provided with a plurality of notches into which said latch of said bell-crank may enter for the purpose of securing said pitch lever in various positions following movement of said pitch lever to or from positions corresponding to full forward, intermediate, zero, or full reverse pitch placement of the propeller.

21. In a mechanism of the character described, a propeller pitch adjusting shaft, a pitch lever connected therewith for turning the same, a throttle lever serving as a handle for said pitch lever, a bell-crank pivotally mounted on said pitch lever to be severally operated by movements of said throttle lever relative to said pitch lever and movements of an automatic throttle closing means having as a principal part thereof a sector, one extremity of said bell-crank having connection with said throttle adjusting means and the other extremity of said bell-crank having the form of a latch, said latch cooperating with said sector to prevent or permit free manual operation of said throttle adjusting means, said sector being provided with a slot through which said latch of said bell-crank passes for the purpose of limiting the extent of manual operation of the throttle adjusting means during all periods of movements of said pitch lever, and for the further purpose of limiting the maximum movements of said pitch lever to positions corresponding to full forward pitch and full reverse pitch of the propeller, said sector being further provided with a plurality of notches into which said latch of said bell-crank may enter for the purpose of securing said pitch lever in various positions following movement of said pitch lever to or from positions corresponding to full forward, intermediate, zero, or full reverse pitch placement of the propeller, and for the still further purpose of limiting the extent of manual operation of the throttle lever corresponding to the adjustments of said pitch lever enumerated herein above.

22. In a mechanism of the character described, a propeller pitch changing means including a manually operated control member and a throttle adjusting means including a second manually operated control member pivotally mounted upon the top of and forming a handle for said first manually operated control member.

23. In a mechanism of the character described, a propeller pitch changing means including a lever for operating the same and a throttle adjusting means including a second lever pivotally mounted upon the top of and forming a handle for operating said first-mentioned lever.

24. In a mechanism of the character described, a propeller pitch changing means including a lever for operating the same and a throttle adjusting means including a second lever pivotally mounted upon the top of and forming a handle for operating said first-mentioned lever, said throttle adjusting means being operable independently of said pitch changing means.

25. In a mechanism of the character described, a propeller pitch changing means including a pitch lever for operating the same from one extreme position corresponding to full forward pitch of the propeller to another position corresponding to the full reverse pitch of the propeller and a throttle adjusting means including a throttle lever pivotally mounted upon the top of and forming a handle for operating said first-mentioned lever and a connection between said pitch and throttle levers whereby full operation of said throttle lever releases and produces the operation of said pitch lever, with the operation of the said throttle lever preceding the operation of the said pitch lever.

26. In a mechanism of the character described, a propeller pitch changing means including a lever, a throttle adjusting device carried by said pitch changing means and including a lever pivotally mounted upon and movable with said first mentioned lever, and means cooperating with said levers to limit the adjustment effect of said last mentioned lever and effect an adjustment of said throttle adjusting device prior to changes in the adjustment of the propeller pitch changing mechanism.

27. In a mechanism of the character described, a propeller pitch changing means including a lever, a throttle adjusting device carried by said pitch changing means and including a lever pivotally mounted upon and movable with said first mentioned lever, and means cooperating with said levers to limit the adjustment effect of the said last mentioned lever and hold said throttle adjusting device in a position of minimum throttle opening prior to all changes in the adjustment of the propeller pitch changing means.

28. In a mechanism of the character described, a propeller pitch changing means including a lever, a throttle adjusting device carried by said pitch changing means and including a lever pivotally mounted upon and movable with said first mentioned lever, and means cooperating with said levers such that said first mentioned lever may be secured in predetermined positions corresponding to adjustments of said pitch changing means ranging from zero pitch to full forward pitch of the propeller and that said throttle adjusting device will be automatically regulated upon release of said second mentioned lever for securing said first mentioned lever in any one of the aforementioned predetermined positions.

29. In a mechanism of the character described, a propeller pitch changing means including a lever, a throttle adjusting device carried by said pitch changing means and including a lever pivotally mounted upon and movable with said first mentioned lever, and means cooperating with said levers such that release of said second mentioned lever with said first mentioned lever in a position corresponding to an adjustment of said pitch changing means for full forward pitch of the propeller will automatically effect maximum opening of the engine throttle.

30. In a mechanism of the character described, a propeller pitch changing means including a lever, a throttle adjusting device carried by said pitch changing means and including a lever pivotally mounted upon and movable with said first mentioned lever, and means cooperating with said levers such that release of said second mentioned lever with said first mentioned lever in a position corresponding to an adjustment of said pitch changing means for full reverse pitch of the propeller will automatically effect maximum opening of the engine throttle.

DANIEL A. DICKEY.